United States Patent
Shirasawa

[11] Patent Number: 6,135,411
[45] Date of Patent: Oct. 24, 2000

[54] STAND ROTATING MECHANISM

[75] Inventor: Masahiko Shirasawa, Chiba, Japan

[73] Assignee: Sony Corporation, Tokyo, Japan

[21] Appl. No.: 09/025,312

[22] Filed: Feb. 18, 1998

[30] Foreign Application Priority Data

Feb. 28, 1997 [JP] Japan ................................ 9-046117

[51] Int. Cl.[7] ............................................. A47B 95/00
[52] U.S. Cl. .................. 248/349.1; 248/918; 361/681
[58] Field of Search ............................... 248/349.1, 918, 248/920, 923, 919, 921; 361/681, 682

[56] References Cited

U.S. PATENT DOCUMENTS

| | | | |
|---|---|---|---|
| 3,908,942 | 9/1975 | Keith et al. ............................ | 248/158 |
| 4,483,503 | 11/1984 | Gahan ................................... | 248/349 |
| 4,591,120 | 5/1986 | Bryant-Jeffries et al. ............ | 248/179 |
| 4,852,830 | 8/1989 | Howard et al. ....................... | 248/183 |
| 5,209,446 | 5/1993 | Kawai .................................... | 248/349 |
| 5,518,216 | 5/1996 | Wu ........................................ | 248/371 |
| 5,588,625 | 12/1996 | Beak ...................................... | 248/371 |
| 5,632,463 | 5/1997 | Sung et al. ........................... | 248/371 |

*Primary Examiner*—Anita M. King
*Assistant Examiner*—Kimberly Wood
*Attorney, Agent, or Firm*—Jay H. Maioli

[57] ABSTRACT

A stand rotating mechanism having a high strength and a high durability and being rotatable 90° for each of right and left sides. The stand rotating mechanism includes a rotary base, and a rotary base supporting base for rotatably supporting the rotary base. The rotary base includes locking members and a guide slot on and in the convex surface thereof. The rotary base supporting base includes on its concave surface a rotating shaft to be inserted in the guide slot and members to be locked. The locking members are abutted on the members to be locked in accordance with a rotational state of the rotary base, to restrict the rotation of the rotary base.

20 Claims, 11 Drawing Sheets

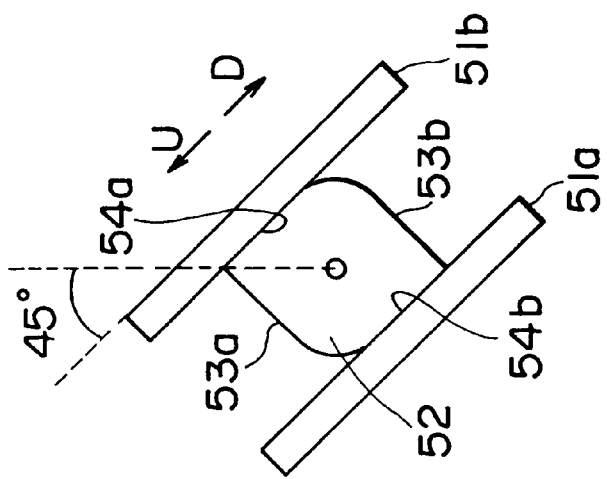
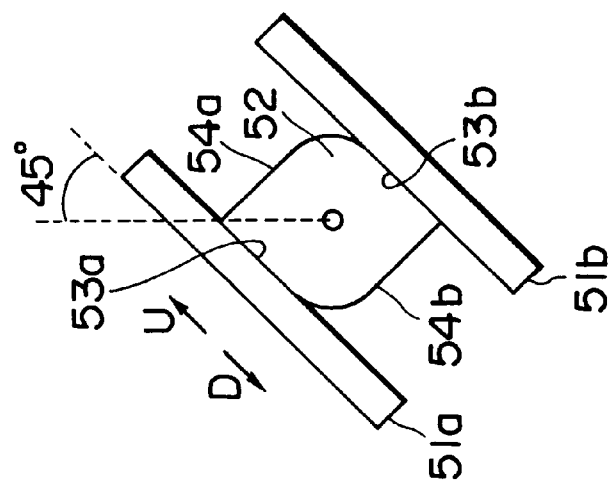
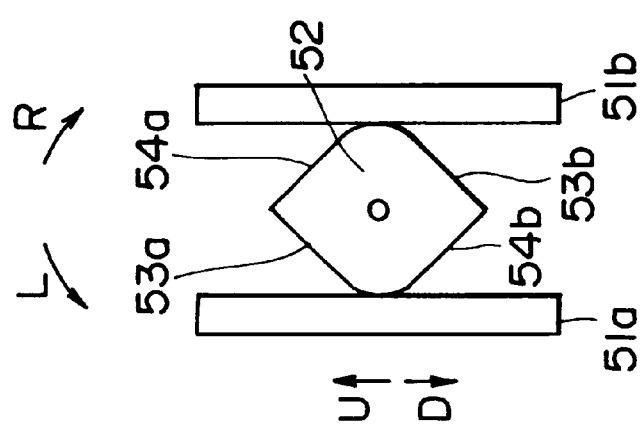

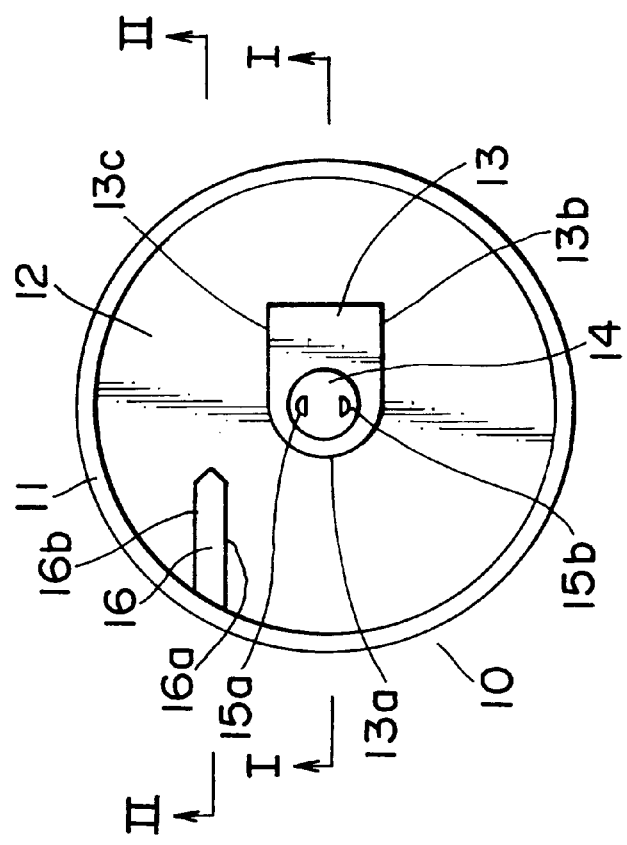
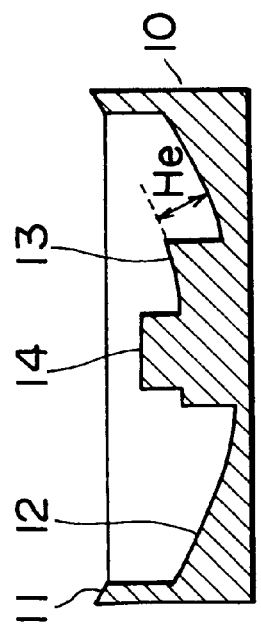
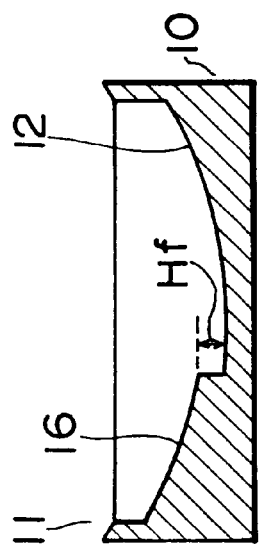

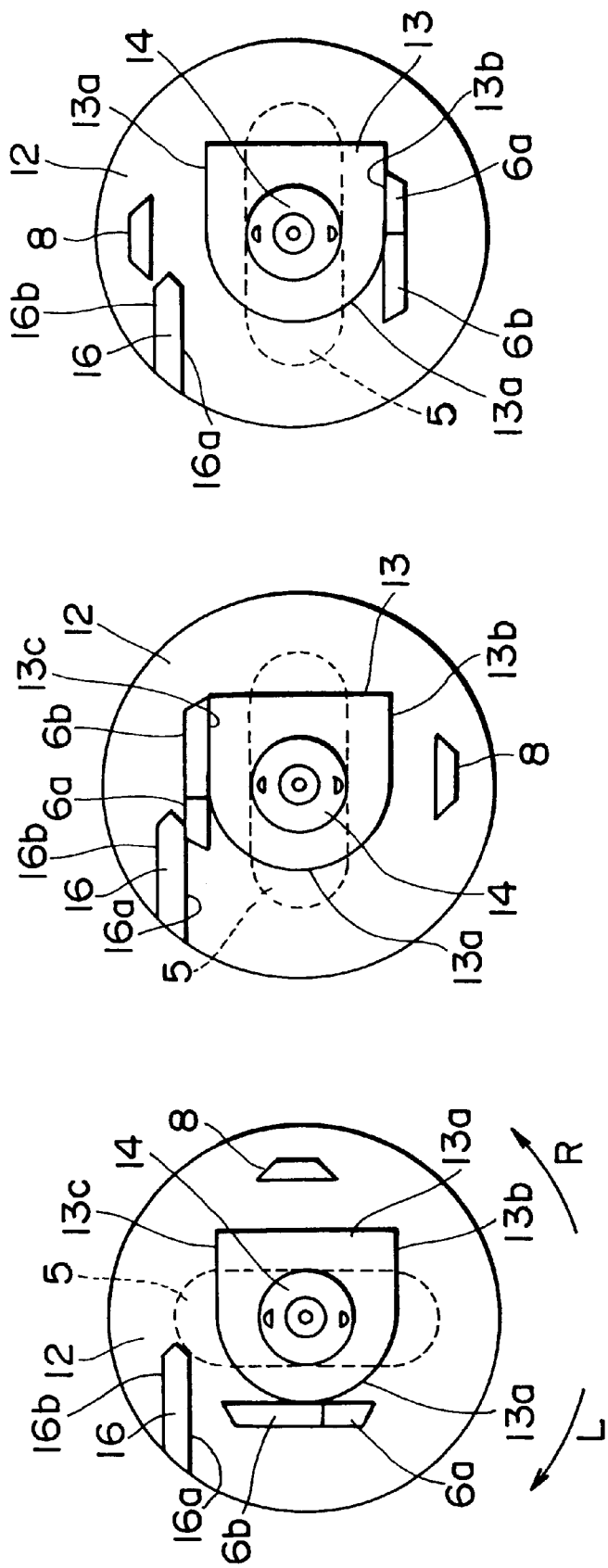

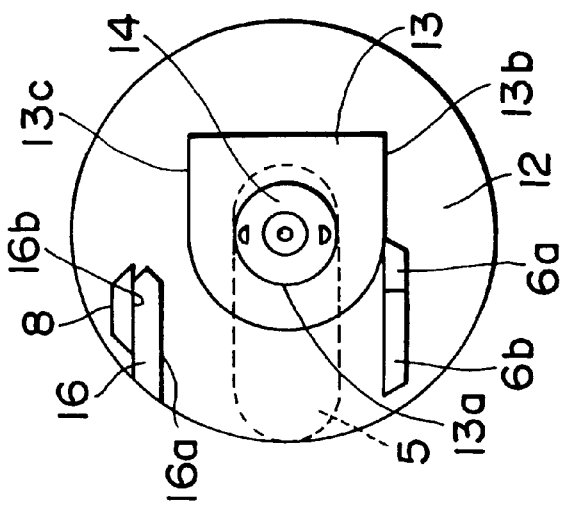
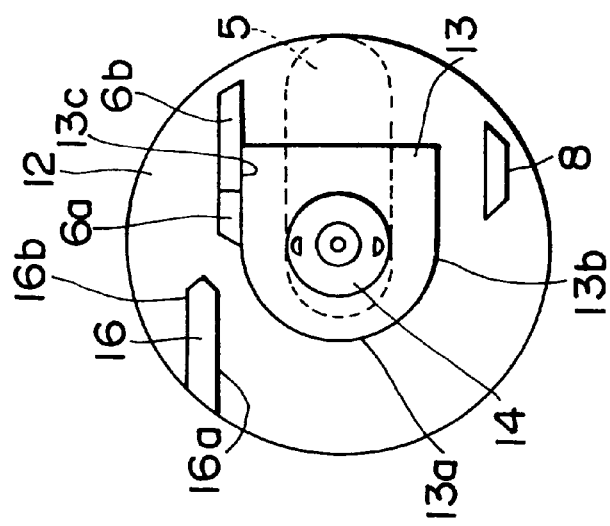
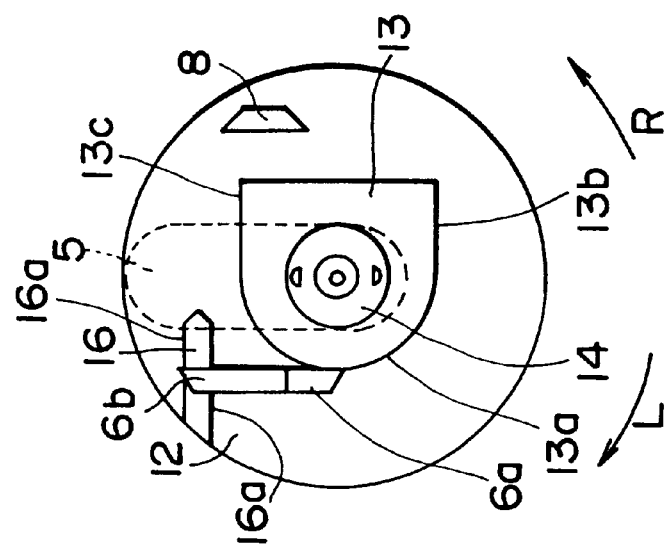

STAND ROTATING MECHANISM

BACKGROUND OF THE INVENTION

The present invention relates to a mechanism for rotating a stand constituting a leg portion of a monitor device or the like.

For example, a monitor device for monitoring an image outputted from a personal computer or the like adopts a stand having a horizontally rotating mechanism and a vertically tilting mechanism for optimizing orientation of a display section in accordance with an installation location of the monitor device and the viewing angle of the user operating the monitor device.

FIG. 1 is a typical side view of a monitor device having a related art stand rotating mechanism.

As shown in FIG. 1, a monitor device 40 includes a monitor section 41 containing a CRT (Cathode Ray Tube) and a CRT substrate which constitute a display section; a tilting section 42 for supporting the monitor section 41, which has on a bottom surface a spherical sliding portion rotatable in the vertical direction (shown by an arrow U or D) for changing orientation of the monitor section 41; a rotary base 43 for supporting the tilting section 42, which is rotatable in the horizontal direction (shown by an arrow L or R); and a leg section 44 for rotatably supporting the rotary base 43.

In this way, the monitor device 40 adopts the stand rotating mechanism composed of the tilting section 42 and the rotary base 43. The monitor section 41 can be rotated in the vertical direction (shown by an arrow U or D) and the lateral direction (shown by an arrow L or R) by the stand rotating mechanism, and accordingly, even when the user is not positioned directly opposite to the monitor device 40, he can take a suitable monitoring position by displacing orientation of the monitor section 41.

In addition, with respect to the stand rotating mechanism, for maintenance of a power supply cable or a video signal cable led from the monitor section 41, the horizontally rotating angle given by the rotary base 43 is limited to a value, for example, within 180° (90° for each of right and left sides).

Incidentally, although the monitor device 40 shown in FIG. 1 adopts the stand rotating mechanism of a three-layer structure having the tilting section 42, rotary base 43, and leg section 44, such a stand rotating mechanism has problems that the manufacturing cost is high, the strength is insufficient, and the durability and assembling performance are poor.

To cope with such problems, a stand rotating mechanism of a two layer structure is known, in which a rotary base rotatable in the tilting direction and in the horizontal direction is disposed on the leg section 44.

FIGS. 2A to 2C are typical plan views schematically showing rotation of a stand rotating mechanism of a two layer structure.

As shown in these figures, a rotation restricting section 52 is inserted between a pair of guide walls 51a and 51b. The rotation restricting section 52 has abutment planes 53a, 53b, 54a, and 54b to be abutted on the guide walls 51a and 51b in accordance with a horizontally rotational state of the monitor section. The abutment plane 53a crosses the abutment plane 54a, for example, at 90°, and similarly the abutment plane 53b crosses the abutment plane 54b, for example, at 90°.

In addition, the guide walls 51a and 51b are projectingly provided on either the rotary base or the leg section, and the rotating restricting section 52 is projectingly provided on either the tilting section or the leg section. Here, the guide walls 51a and 51b are projectingly provided on the rotary base, and the rotation restricting section 52 is projectingly provided on the leg section.

For example, FIG. 2A shows a state in which the rotating and tilting directions of the monitor section are directed to the front side. When the monitor section is tilted from such a state, the guide walls 51a and 51b are moved in the direction shown by an arrow U or D.

When the monitor section is rotated, for example, in the direction shown by an arrow R (rotational direction), the guide wall 51a is abutted on the abutment plane 53a and the guide wall 51b is abutted on the abutment plane 53b, as shown in FIG. 2B. Thus, the monitor section is rotated, for example 45°, rightward from the state shown in FIG. 2A, and is stopped.

When the monitor section is rotated, for example, in the direction shown by an arrow L (rotational direction) from the state shown in FIG. 2A, the guide wall 51b is abutted on the abutment plane 54a and the guide wall 51a is abutted on the abutment plane 54b, as shown in FIG. 2C. Thus, the monitor section is rotated, for example 45°, leftward, and is stopped.

The stand rotating mechanism of such a two layer structure is effective to reduce the number of parts and realize the low cost, high strength, high durability, and good stability as compared with the stand rotating mechanism having the three layer structure shown in FIG. 1; however, as shown in FIGS. 2A to 2C, the horizontally rotational angle is limited to a value within 45° for each of the right and left sides from the center.

Accordingly, a stand rotating mechanism rotatable 90° for each of right and left sides has been required to have a three layer structure, and it has presented, as described above, the problems in terms of manufacturing cost, strength, durability and the like. Besides, the stand rotating mechanism having a two layer structure has presented, as described above, the problem that the rotational angle is limited to a value within 45° for each of right and left sides.

SUMMARY OF THE INVENTION

An object of the present invention is to provide a stand rotating mechanism having a high strength and a high durability and being rotatable 90° for each of right and left sides.

To achieve the above object, according to a first aspect of the present invention, there is provided a stand rotating mechanism including: a rotary member including a convex bottom surface having a guide slot formed at a region including a center of the convex surface; a rotary member supporting member having an upper concave surface to be mated to the convex surface of the rotary member, the supporting member having a rotating shaft to be fitted in the guide slot; a first member to be locked which is provided on the concave surface of the supporting member in such a manner as to project from a peripheral portion to a central portion of the concave surface of the supporting member; and a pair of asymmetric locking members provided on the convex surface of the rotary member substantially in parallel to the guide slot, the locking members being locked with the first member to be locked when the rotary member is rotated a specific angle in the horizontal direction.

According to a second aspect of the present invention, there is also provided a stand rotating mechanism including: a rotary member supporting member including a convex bottom surface having a guide slot formed at a region including a center of the convex surface of the supporting member; a rotary member having a lower concave surface to be mated to the convex surface of the supporting member, the supporting member having a rotating shaft to be fitted in the guide slot; a first locking member provided on the concave surface of the rotary member in such a manner as to project from a peripheral portion to a central portion of the concave surface of the rotary member; and a pair of laterally asymmetric members to be locked which are provided on the convex surface of the supporting member substantially in parallel to the guide slot, the members to be locked being locked with the member to be locked when the rotary member is rotated a specific angle in the horizontal direction.

According to the present invention, there can be provided a stand rotating mechanism capable of reducing the number of parts, of enhancing the strength, durability, and like, and of being rotatable 90° for each of right and left sides.

As described above, according to the present invention, there can be provided a stand rotating mechanism with a simple structure by providing projecting locking members and projecting members to be locked at specific positions of a rotary member having a convex surface and a rotary base supporting base having a concave surface, respectively. This is effective to improve the low manufacturing cost, insufficient strength, and poor durability of the related art mechanism, and also to enhance an assembling performance. Further, since the horizontally rotational angle of the rotary member can be set at a value, for example, within 90° for each of the right and left sides with a two layer structure, it is possible to make wider the rotational angle of the rotary member than that of the mechanism used for the related art monitor device having a two layer structure, and hence to make wider the usable range of the user.

BRIEF DESCRIPTION OF THE DRAWINGS

FIGS. 2A to 2C are typical views illustrating rotation of a related art stand rotating mechanism having a two layer structure;

FIGS. 7A to 7C are plan views illustrating a configuration of a rotary base supporting base of the stand rotating mechanism;

FIGS. 8A to 8C are views illustrating a rotational motion of the rotary base directed in the horizontal direction;

FIGS. 10A to 10C are views illustrating the rotational motion of the rotary base tilted downward.

DETAILED DESCRIPTION OF THE INVENTION

Hereinafter, an embodiment of the present invention will be described.

Figure 3:
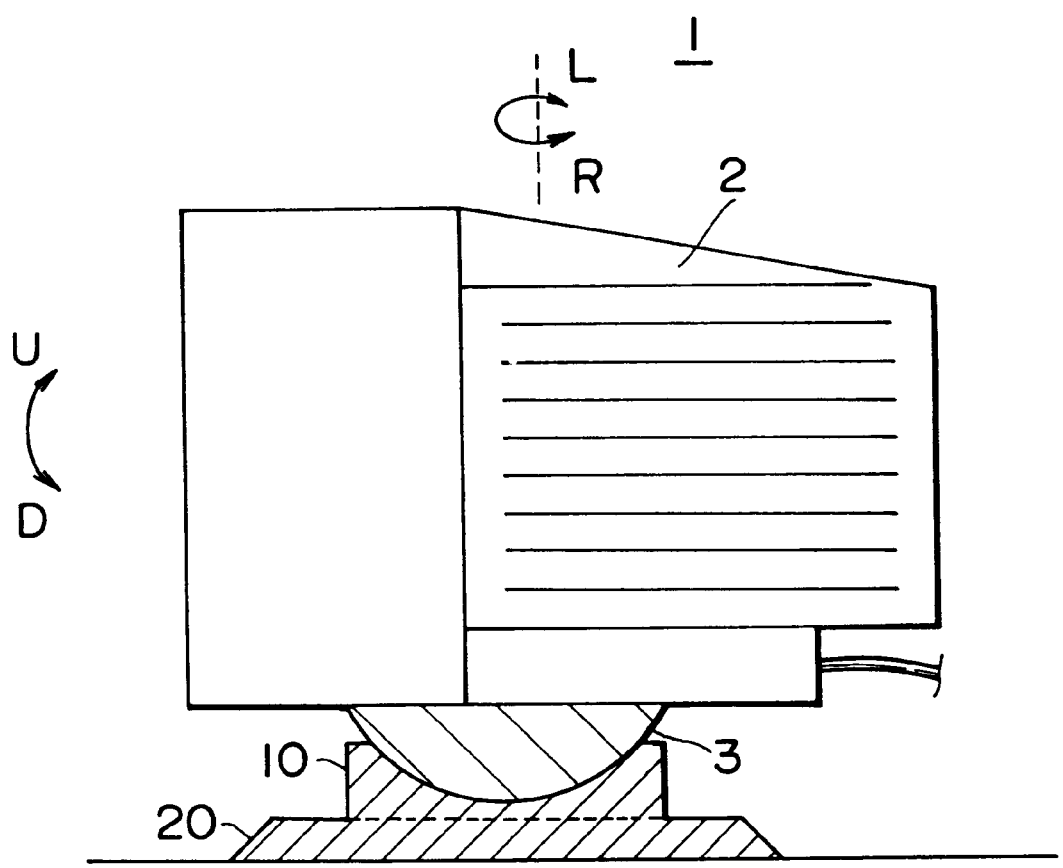
FIG. 3 is a plan view showing a monitor device according to an embodiment of the present invention from a side surface thereof.

FIG. 3 is a plan view typically showing a monitor device in this embodiment from a side surface thereof, with a configuration of a stand rotating mechanism shown in cross-section.

Figure 1:
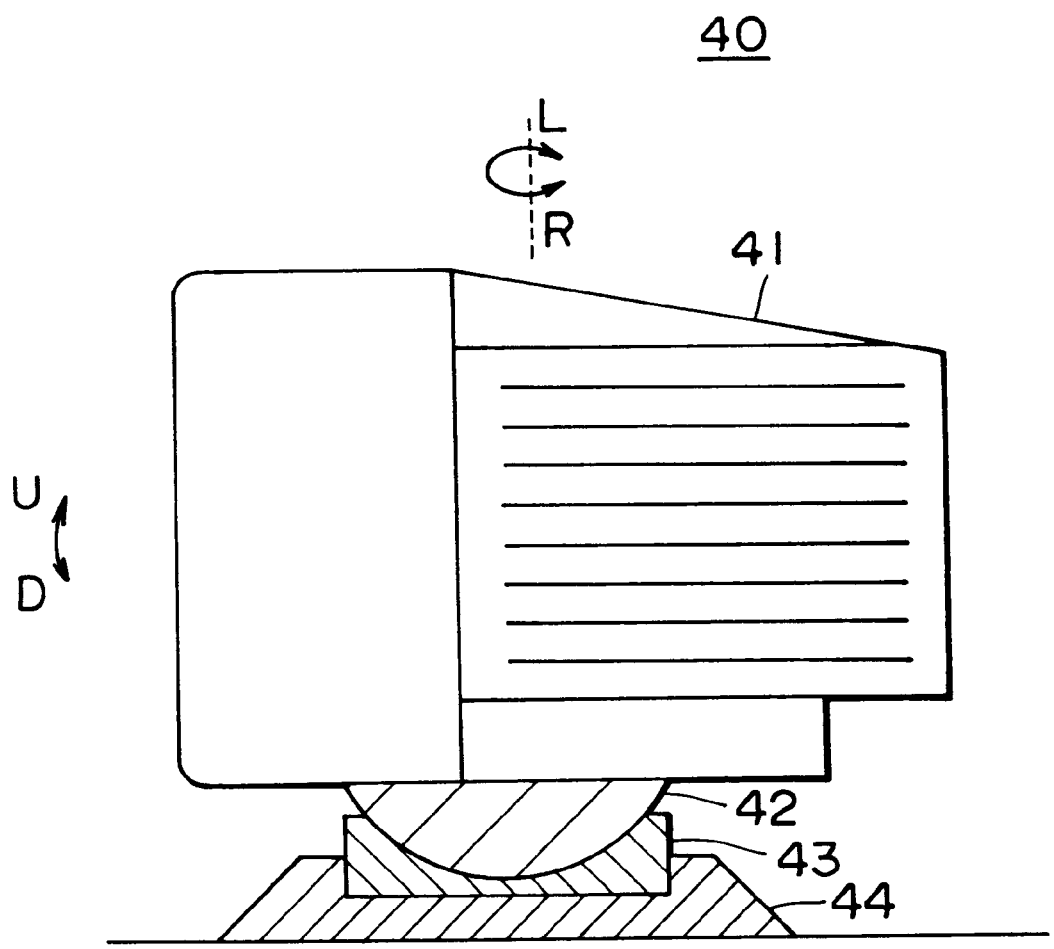
FIG. 1 is a side view showing a configuration of a related art monitor device.

A monitor section 2 constituting a monitor device 1 in this embodiment is equivalent to the monitor section 41 previously shown in FIG. 1. The monitor section 2 is disposed on a rotary base 3, taken as a rotary member, in such a manner as to be rotatable in the leftward direction (shown by an arrow L), rightward direction (shown by an arrow R), and/or upward direction (shown by an arrow U) and downward direction (shown by an arrow D). The rotary base 3 may be formed integrally with a housing of the monitor section 2, or may be formed separately from the housing and then assembled therewith.

The rotary base 3 has a spherical portion which is typically convex to a rotary base supporting base 10 for supporting the rotary base 3. The spherical portion has at a specific position a locking means, formed into a projecting shape, for restricting rotation of the rotary base 3 as described later. The rotary base supporting base has a spherical portion which is typically concave to the rotary base 3, and is adapted to rotatably support the rotary base 3 in the horizontal direction and in the tilting direction.

The concave surface of the rotary base supporting base 10 has at a specific position a means to be locked, formed into a projecting shape, and the like. The means to be locked is adapted to lock the locking means of the rotary base 3 as described later for restricting rotation of the rotary base 3. The locking means and the means to be locked are provided at positions at which they are allowed to be locked with each other in accordance with a rotating state (in the lateral/tilting direction) of the rotary base 3, to restrict the rotational angle at a value, for example, within 90° for each of right and left sides when viewed from the front side, irrespective of a tilting angle of the rotary base 3.

The rotary base supporting base 10 is formed integrally with a leg section 20 used for placing the monitor device 1 on a desk; however, only the rotary base supporting base 10 is shown in the following figures used for description of the embodiment.

Figure 4A:
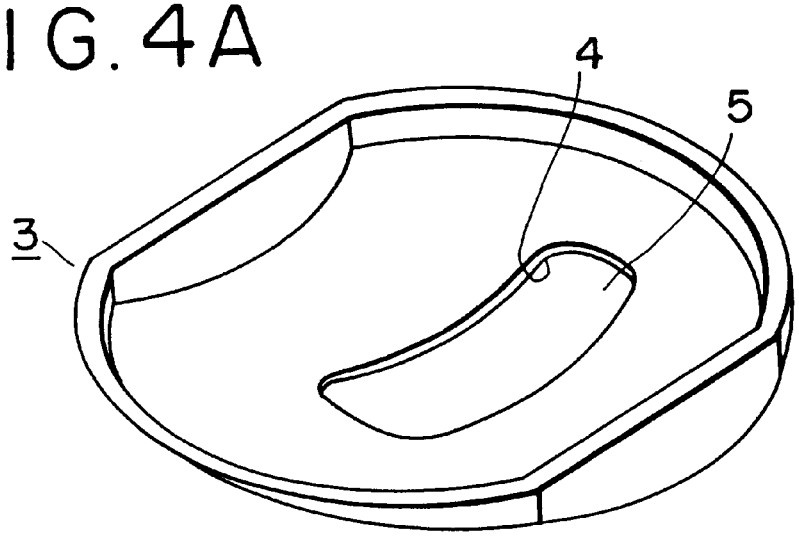
FIGS. 4A to 4C are exploded perspective views showing a stand rotating mechanism of the monitor device in the embodiment.
Figure 4B:
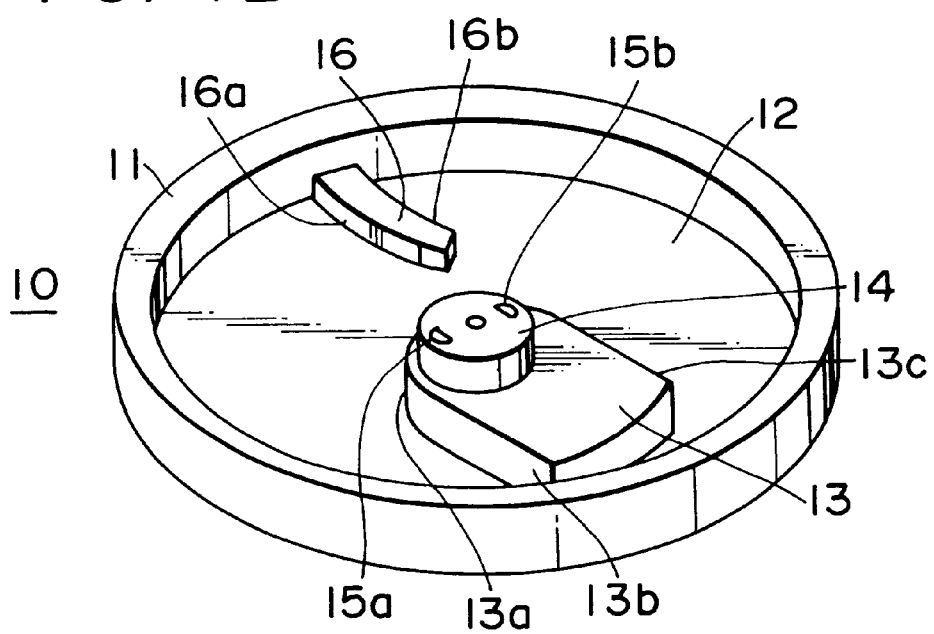
Figure 4C:
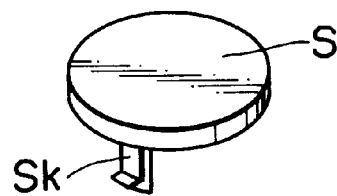

FIGS. 4A to 4C are exploded perspective views respectively showing the rotary base 3, rotary base supporting base 10, and a stopper S for stopping the rotary base 3.

FIG. 4A shows the rotary base from the back surface side.

The rotary base 3 has, as described above, a convex surface 4 which is convex to the rotary base supporting base 10, and it allows the monitor device 2 to be disposed thereon. The convex surface 4 has a guide slot 5 passing through the central portion of the convex surface 4. The width of the guide slot 5 is set to be slightly larger than a diameter of a rotating shaft 14 (which will be described with reference to FIG. 4B) of the rotary base supporting base 10 so that the rotating shaft 14 is to be inserted in the guide slot 5.

With this configuration, the rotary base 3 is rotatable around the rotating shaft 14 in the horizontal direction and also in the tilting direction along the longitudinal direction of the guide slot 5. The extension of the guide slot 5 in the longitudinal direction is directed to the front or back side of the monitor section 2. The rotation of the rotary base 3 in the tilting direction is limited depending on a length of the guide slot 5.

In addition, a locking means is projectingly provided on the front side of the convex surface 4 in such a manner as to be parallel to the guide slot 5; however, it is not shown in FIG. 4A which shows the rotary base 3 from the back side. The locking means will be described later in detail with reference to FIGS. 6A to 6E.

The rotary base supporting base 10 has along its outer periphery a supporting wall 11 for supporting the convex surface 4 of the rotary base 3, as shown in FIG. 4B. An upper surface of the supporting wall 11 is tapered as seen in FIGS. 7B and 7C, for allowing the rotary base 3 to be stably mounted thereon. While not shown, a separate damping member or lubricating member (for example, made from teflon) may be disposed on the upper surface of the supporting wall 11.

As shown in FIG. 4B, a concave surface 12 is formed into a circular-arc like the convex surface 4. A member 13 to be locked, the rotating shaft 14, and a member 16 to be locked are projectingly provided on the concave surface 12. The member 13 to be locked is formed into an approximately U-shape having a sliding-contact surface 13a formed into a circular-arc concentric with the rotating shaft 14 and also having walls 13b and 13c to be locked which extend from end portions of the sliding-contact surface 13a. The member 13 to be locked is disposed such that the guide slot 5 crosses the walls 13b and 13c to be locked, for example, at 90° when the rotary base 3 is mounted and directed to the front side of the monitor section 2. To be more specific, by allowing the extension of the guide slot 5 in the longitudinal direction to be directed to the front side of the monitor section 2, the horizontally rotational angle of the monitor section 2 can be restricted to a value, for example, within 90° for each of the right and left sides. At this time, the locking means (not shown) is abutted on the wall 13b or 13c to be locked in accordance with the rotational angle of the rotary base 3, to thus restrict the rotational angle of the rotary base 3.

Figure 5:
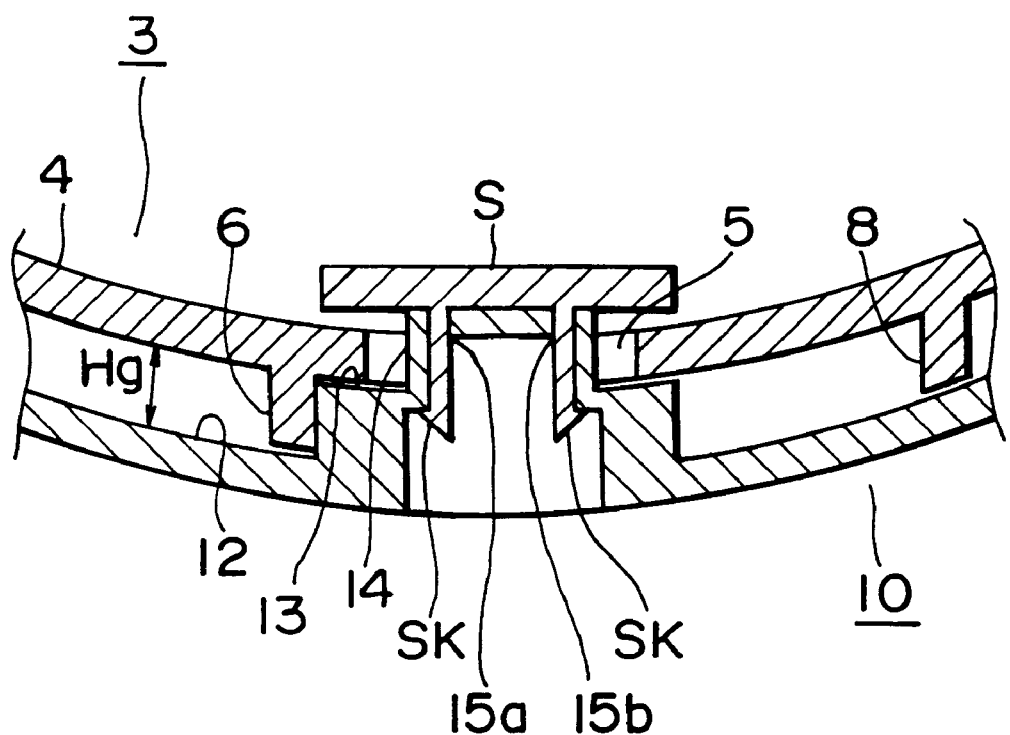
FIG. 5 is a sectional view showing the stand rotating mechanism of the monitor device in this embodiment.

The rotating shaft 14 is projectingly provided substantially at a central portion of the concave surface 12 so as to be inserted in the guide slot 5. In an upper surface of the rotating shaft 14 are formed locking holes 15a and 15b to which locking pieces Sk of the stopper S shown in FIG. 4C are to be inserted. The stopper S, which is formed into a disk having a diameter longer than the width of the guide slot 5, is mounted on the rotating shaft 14 through the guide slot 5, to thereby stabilize the mounting state of the rotary base 3. Such a state is shown in FIG. 5 in cross-section, in which the locking pieces Sk are locked inside the rotating shaft 14, to fix the stopper S to the rotating shaft 14, thereby preventing the rotary base 3 from being easily slipped off from the rotary base supporting base 10.

In addition, the locking means (locking members 6 and 8) of the rotary base 3, shown in FIG. 5, will be described in detail later.

The member 16 to be locked, shown in FIG. 4B, has walls 16a and 16b to be locked which are parallel to the walls 13b and 13c to be locked. And, the locking means (not shown) is abutted on the wall 16a or 16b to be locked in accordance with the rotational direction of the rotary base 3, to restrict the rotational angle of the rotary base In addition, the locking state between the locking means of the rotary base 3 and the walls 13b, 13c, 16a and 16b of the rotary base supporting base 10 will be described in detail with reference to FIG. 8A to FIG. 10C. Also, although in this embodiment the rotating shaft 14 is formed on the member 13 to be locked, the member 13 to be locked may be formed of only the peripheral walls, that is, the sliding-contact surface 13a and the walls 13b and 13c to be locked. In this case, the rotating shaft 14 may be projectingly provided directly on the concave surface 12.

Next, a configuration of the rotary base 3 will be described in detail.

Figure 6A:
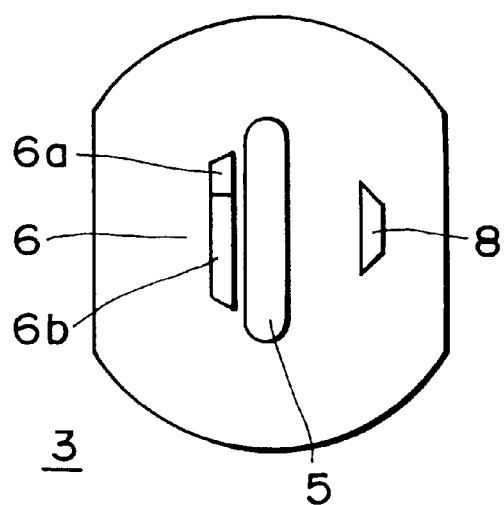
FIGS. 6A to 6E are plan views illustrating a configuration of a rotary base of the stand rotating mechanism.
Figure 6B:
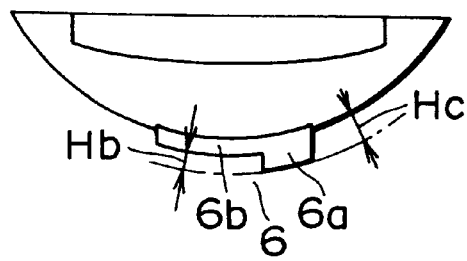
Figure 6C:
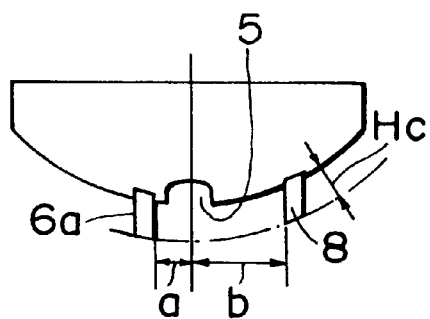
Figure 6D:
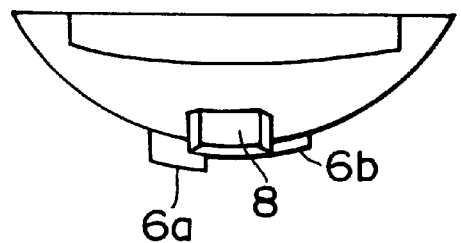
Figure 6E:
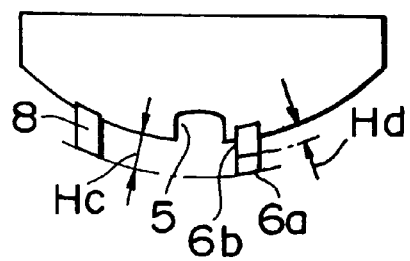

FIGS. 6A to 6E are plan views each showing the rotary base 3, wherein FIG. 6A is a plan view (bottom view); FIG. 6B is a left side view; FIG. 6C is a front view; FIG. 6D is a right side view; and FIG. 6E is a rear view.

As shown in these figures, on the convex surface 4 are provided the locking members 6 and 8. The locking member 6 is parallel to the guide slot 5, and it includes locking portions 6a and 6b different in height. The locking member 8 is positioned opposite to the locking member 6 with the guide slot 5 put therebetween.

The locking member 6 is, as described above, composed of the locking portions 6a and 6b different in height. The side surfaces of the locking portions 6a and 6b form the same plane. As shown in FIG. 6B, the locking portion 6a has a height Hc, and the locking portion 6b is lower by a height Hb than the height Hc of the locking portion 6a. The top surface of the locking portion 6a has a circular-arc concentric with the convex surface 4. In addition, the height Hc is set so that the top surface of the locking portion 6a is separated a slight gap from the concave surface 12 (not shown) when the rotary base 3 is mounted on the rotary base supporting base 10.

Further, the height Hb of the locking portion 6b is set so that the locking portion 6b is not abutted on the member 16 to be locked when the rotary base 3 is rotated on the rotary base supporting base 10 as described later. The locking member 6 is, as shown in FIG. 6C, disposed in such a manner as to be separated a distance "a" from the guide slot 5. The distance "a" is set so that the rotary base 3 can be rotated along the sliding-contact surface 13a of the supporting base 10.

As shown in FIG. 6C, the locking member 8 has the same height Hc as that of the locking portion 6a, and a top surface of the locking member 8 is formed into a circular-arc concentric with the convex surface 4. The locking member 8 is also separated a distance "b" from the guide slot 5, and it is shorter than the locking member 6. This is because the rotary base 3 can be rotated in a state in which the locking member 8 is not abutted on end portions of the walls 13a and 13b (not shown) to be locked of the member 13 to be locked.

The locking members 6 and 8 may be formed integrally with the convex surface 4, or may be formed separately from the convex surface 4 and then mounted thereon.

Next, a structure of the rotary base supporting base 10 will be described.

FIGS. 7A to 7C are plan views showing the rotary base supporting base 10, wherein FIG. 7A is a front view; FIG. 7B is a sectional view taken on line I—I; and FIG. 7C is a sectional view taken on line II—II.

As shown in FIG. 7A, the rotating shaft 14 is projectingly provided substantially at the central portion of the concave surface 12, and the rotary base 3 (not shown) is rotated around the rotating shaft 14. As is apparent from this figure, the walls 13b and 13c to be locked are formed in parallel to the walls 16a and 16b to be locked. The horizontally rotational angle of the rotary base 3 can be restricted by abutment of the locking member 6 on the walls 13a and 13b to be locked, abutment of the locking member 6 or 8 on the wall 16a to be locked, and abutment of the locking member 8 on the wall 16b to be locked, in accordance with the tilting angle of the rotary base 3.

As shown by the cross-section of FIG. 7B, the member 13 to be locked has a height He from the concave surface 12, and a top surface of the member 13 to be locked is formed into a circular-arc concentric with the concave surface 12. The height He is set to be equal to or lower than the height Hc of the locking portion 6a and the locking member 8. Further, the height He is set to be higher than a height obtained by adding a slight height $H_\alpha$ to the height Hd shown in FIG. 6E. That is, the relationship of the height He is expressed as follows:

$$H_\alpha + Hd < He \leq Hc$$

In addition, the slight height $H_\alpha$ is equivalent to a difference between a distance Hg (see FIG. 5) from the convex surface 4 to the concave surface 12 and the height Hc. The height He may be set to be equal to the height Hc so that the top surfaces of the locking members 6 and 8 are slid on the concave surface 12 insofar as the sliding motion of the locking members 6 and 8 obstructs the rotational motion of the rotary base 3.

By setting the height of the member 13 to be locked at the value He as described above, it is possible to smoothly rotate the rotary base 3 on the rotary base supporting base 10.

As shown by the cross-section of FIG. 7C, the member 16 to be locked has a height Hf from the concave surface 12. The height Hf is set to be higher than the height $H_\alpha$ and also to be equal to or lower than the height Hd of the locking portion 6b. That is, the relationship of the height Hf is expressed as follows:

$$H_\alpha < Hf \leq Hd$$

With this arrangement, when the rotary base 3 is rotated while being tilted at a certain tilting angle, the locking portion 6b is not abutted on the member 16 to be locked, that is, it can pass by the member 16 to be locked, resulting in no-obstruction of the rotation of the rotary base 3.

The member 13 to be locked, rotating shaft 14, and member 16 to be locked may be formed integrally with the concave surface 12, or they may be formed separately from the concave surface 12 and then mounted thereon.

Next, the rotational motion of the rotary base 3 will be briefly described. In addition, FIG. 8A to FIG. 10C used for the following description show in plan views the structure on the concave surface 12 of the rotary base supporting base 10, and the locking members 6 and 8 and the guide slot 5 formed on and in the rotary base 3, and do not show the rotary base 3 itself.

FIGS. 8A to 8C are views showing a state in which the rotary base 3 is directed in the horizontal direction.

When the rotary base 3 is rotated, for example 90°, in the leftward direction (shown by the arrow L) from the state in which the rotary base 3 is directed to the front side as shown in FIG. 8A, the locking member 6 (locking portion 6a) is abutted on a tip portion of the wall 16 to be locked or the locking portion 6b is abutted on the wall 13c to be locked, as shown in FIG. 8B, to restrict the further rotation of the rotary base 3. Besides, when the rotary base 3 is rotated, for example 90°, in the rightward direction (shown by the arrow R) from the state shown in FIG. 8A, the locking member 6 (locking portion 6a and part of the locking portion 6b) is abutted on the wall 13b to be locked, as shown in FIG. 8C, to restrict the further rotation of the rotary base 3.

In this way, when the rotary base 3 directed in the horizontal direction is rotated right and left, the locking member 6 is abutted on the wall 16a and 13c to be locked or abutted on the wall 13b to be locked, to thus restrict the further rotation of the rotary base 3.

Figure 9C:
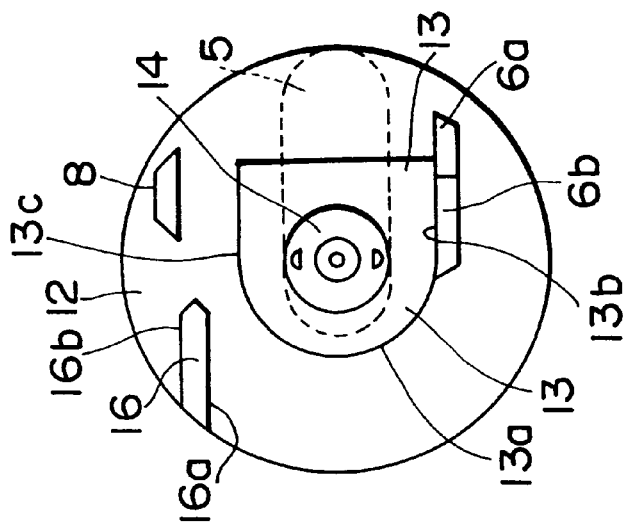
FIGS. 9A to 9C are views illustrating the rotational motion of the rotary base tilted upward.
Figure 9B:
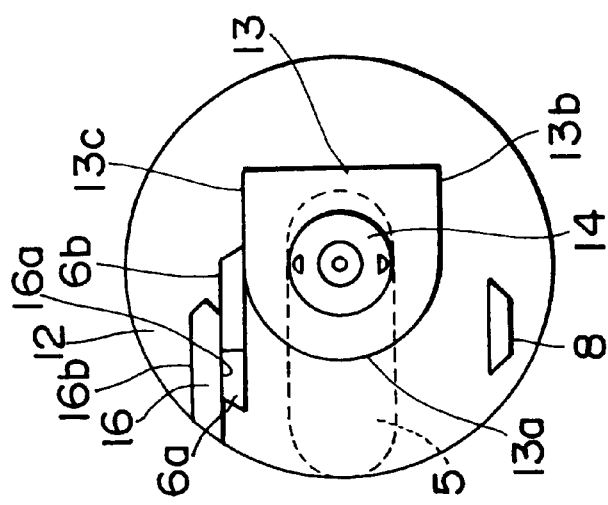
Figure 9A:
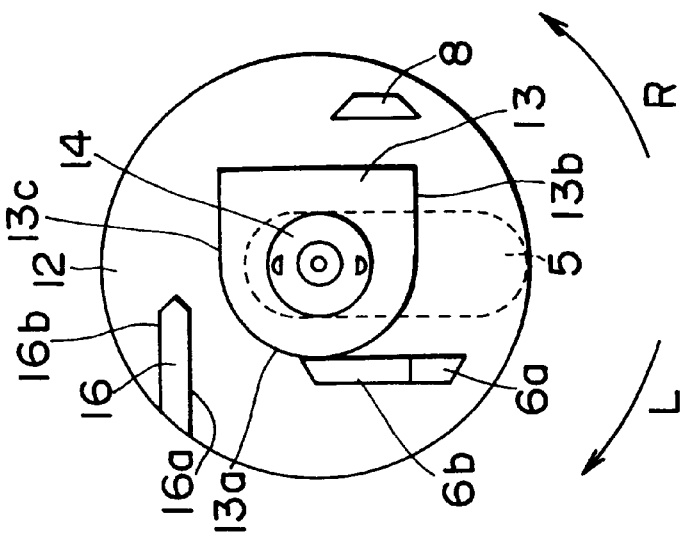

The case where the rotary base 3 is tilted for example upward and rotated right and left is shown in FIGS. 9A to 9C.

When the rotary base 3 is rotated, for example 90°, in the leftward direction (shown by the arrow L) from the state in which the rotary base 3 is directed to the front side as shown in FIG. 9A, the locking member 6 (locking portion 6a and part of the locking portion 6b) is abutted on the wall 16a to be locked of the member 16 to be locked, as shown in FIG. 9B, to restrict the further rotation of the rotary base 3. Besides, when the rotary base 3 is rotated, for example 90°, in the rightward direction (shown by the arrow R) from the state shown in FIG. 9A, the locking member 6 (part of the locking portion 6a and the locking portion 6b) is abutted on the wall 13b to be locked, as shown in FIG. 9C, to restrict the further rotation of the rotary base 3.

In this way, when the rotary base 3 tilted upward is rotated right and left, the locking member 6 is abutted on the wall 16a to be locked or the wall 13b to be locked, to thus restrict the rotation of the rotary base 3 at a value, for example, within 90° for each of the right and left sides.

The case where the rotary base 3 is tilted downward and is rotated right and left is shown in FIGS. 10A to 10C.

In a state in which the rotary base 3 is directed to the front side as shown in FIG. 10A, the locking member 6 crosses the member 16 to be locked; however, since the locking portion 6b and the member 16 to be locked have such a height relationship as not to be abutted on each other as described with reference to FIGS. 7A to 7C, the rotational motion of the rotary base 3 is not restricted.

When the rotary base 3 is rotated, for example 90°, in the leftward direction (shown by the arrow L) from such a state, the locking member 6 (locking portion 6a and part of the locking portion 6b) is abutted on the wall 13c to be locked, as shown in FIG. 10B, to restrict the further rotation of the rotary base 3. Besides, when the rotary base 3 is rotated, for example 90°, in the rightward direction (shown by the arrow R) from the state shown in FIG. 10A, the locking member 8 is abutted on the wall 16b to be locked, as shown in FIG. 10C, to restrict the further rotation of the rotary base 3.

In this way, when the rotary base 3 tilted downward is rotated right and left, the locking member 6 is abutted on the wall 13c to be locked and the locking member 8 is abutted on the wall 16b to be locked, to restrict the rotation of the rotary base 3 at a value, for example, within 90° for each of the right and left sides.

Figure 11A:
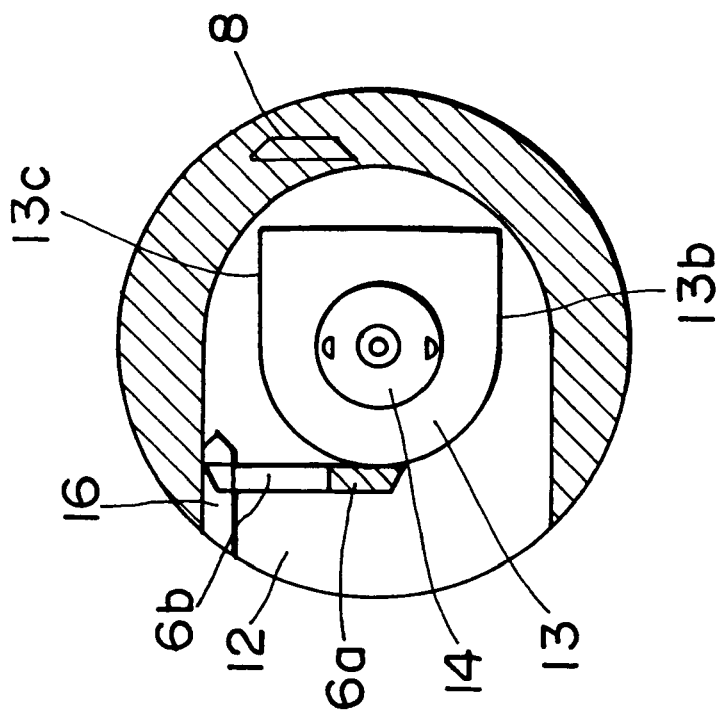
FIGS. 11A and 11B are views illustrating sliding ranges of a locking member and a member to be locked, respectively.
Figure 11B:
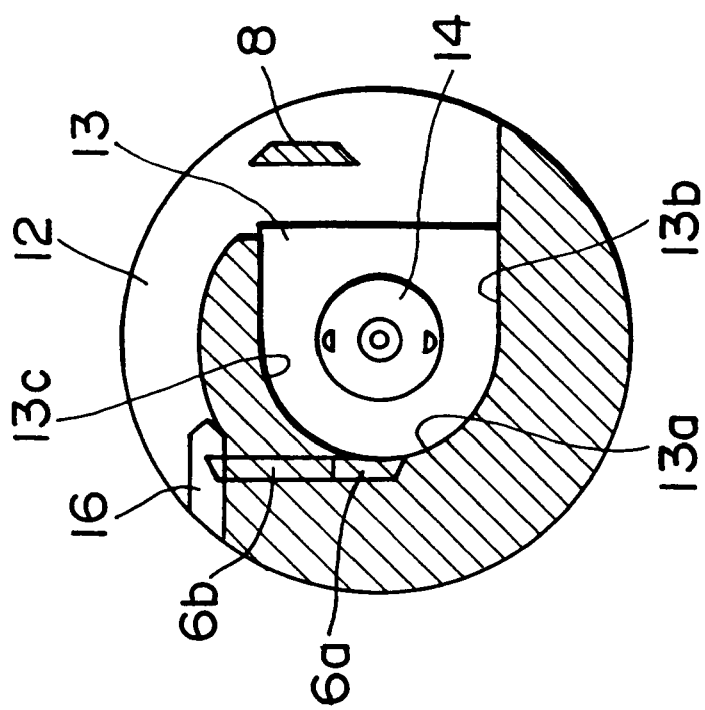

FIGS. 11A and 11B are views respectively showing, by hatching, sliding ranges of the locking portion 6a and the locking member 8 along with rotation of the rotary base 3 described with reference to FIG. 8A to FIG. 10C, wherein FIG. 11A shows the sliding range of the locking portion 6a, and FIG. 11B shows the sliding range of the locking member 8.

As shown in FIG. 11A, the locking portion 6a is moved in a range from positions along the sliding-contact surface 13a and the walls 13b and 13c to be locked of the member 13 to be locked toward the outer periphery of the concave surface 12, to restrict the horizontally rotational angle of the rotary base 3 at a value, for example, within 90° for each of the right and left sides when viewed from the front side.

As shown in FIG. 11B, the locking member 8 is slid near the outer periphery of the rotary base supporting base 10 so as not to be abutted on the member 13 to be locked upon rotation of the rotary base 3. And, when the rotary base 3 is tilted downward and rotated leftward as shown in FIG. 10C, the locking member 8 is abutted on the wall 16b to be locked of the member 16 to be locked, to restrict the rotational angle in the rightward direction at a value, for example, within 90° for each of the right and left sides when viewed from the front side. In addition, as shown in the figure, the distance "b" previously described with reference to FIGS. 6A to 6E is set so that the locking member 8 is not abutted on the member 13 to be locked and is slid in the range shown in FIG. 11B.

In addition, the locking relationship between the rotary base 3 and the rotary base supporting member 10 of the stand rotating mechanism in this embodiment may be reversed. To be more specific, the locking members 6 and 8 may be shifted on the rotary base supporting member 10 side, and the member 13 to be locked, rotating shaft 14, and member 16 to be locked may be shifted to the rotary base 3 side. Further, the shape relationship between the rotary base 3 and the rotary base supporting base 10 may be reversed. To be more specific, the rotary base 3 may be formed into a concave shape, and the rotary base supporting base 10 may be formed into a convex shape. While the description has been made by example of the monitor device 1 in this embodiment, the present invention can be applied to a stand used for television receiver.

What is claimed is:

1. A stand rotating mechanism comprising:
   a rotary member including a convex bottom surface having a guide slot formed at a region including a center of said convex bottom surface;
   a rotary member supporting member having an upper concave surface for mating to said convex bottom surface of said rotary member, said rotary member supporting member having a rotating shaft for fitting in said guide slot;
   a first member for locking provided on said upper concave surface of said rotary member supporting member for projecting from a peripheral portion to a central portion of said upper concave surface of said rotary member supporting member; and
   a pair of asymmetric locking members provided on said convex bottom surface of said rotary member in parallel to said guide slot, said pair of asymmetric locking members being locked with said first member for locking when said rotary member is rotated a specific angle in the horizontal direction,
   wherein one of said pair of asymmetric locking members has a stepped portion on an upper surface of said one of said pair of asymmetric locking members.

2. The stand rotating mechanism comprising:
   a rotary member including a convex bottom surface having a guide slot formed at a region including a center of said convex bottom surface;
   a rotary member supporting member having an upper concave surface for mating to said convex bottom surface of said rotary member, said rotary member supporting member having a rotating shaft for fitting in said guide slot;
   a first member for locking provided on said upper concave surface of said rotary member supporting member for projecting from a peripheral portion to a central portion of said upper concave surface of said rotary member supporting member;
   a pair of asymmetric locking members provided on said convex bottom surface of said rotary member in parallel to said guide slot, said pair of asymmetric locking members being locked with said first member for locking when said rotary member is rotated a specific angle in the horizontal direction; and
   a second member for locking provided on said upper concave surface of said rotary member supporting member, said second member for locking formed in a U-shape having a sliding-contact surface formed into a circular-arc concentric with said rotating shaft and having a pair of walls for locking extending from end portions of said sliding-contact surface in parallel to said first member for locking.

3. The stand rotating mechanism according to claim 1, wherein said pair of asymmetric locking members are formed at different positions apart from said center of said convex bottom surface.

4. The stand rotating mechanism according to claim 1, wherein said specific angle is 90° for each of right and left sides.

5. The stand rotating mechanism according to claim 1, wherein said rotary member is formed integrally with a housing of a monitor.

6. The stand rotating mechanism according to claim 1, further comprising a leg portion and wherein said rotary member supporting member is formed integrally with said leg portion.

7. The stand rotating mechanism according to claim 1, wherein said rotary member supporting member has along an outer periphery of said rotary member supporting member a supporting wall for supporting said convex bottom surface of said rotary member.

8. A stand rotating mechanism comprising:
   a rotary member including a convex bottom surface having a guide slot formed at a region including a center of said convex bottom surface;
   a rotary member supporting member having an upper concave surface for mating to said convex bottom surface of said rotary member, said rotary member supporting member having a rotating shaft for fitting in said guide slot;
   a first member for locking provided on said upper concave surface of said rotary member supporting member for projecting from a peripheral portion to a central portion of said upper concave surface of said rotary member supporting member; and
   a pair of asymmetric locking members provided on said convex bottom surface of said rotary member in parallel to said guide slot, said pair of asymmetric locking members being locked with said first member for locking when said rotary member is rotated a specific angle in the horizontal direction,
   wherein said rotary member supporting member has along an outer periphery of said rotary member supporting member a supporting wall for supporting said convex bottom surface of said rotary member, and
   wherein a top surface of said supporting wall is tapered.

9. A stand rotating mechanism comprising:
   a rotary member including a convex bottom surface having a guide slot formed at a region including a center of said convex bottom surface;
   a rotary member supporting member having an upper concave surface for mating to said convex bottom surface of said rotary member, said rotary member supporting member having a rotating shaft for fitting in said guide slot;
   a first member for locking provided on said upper concave surface of said rotary member supporting member for projecting from a peripheral portion to a central portion of said upper concave surface of said rotary member supporting member; and
   a pair of asymmetric locking members provided on said convex bottom surface of said rotary member in parallel to said guide slot, said pair of asymmetric locking members being locked with said first member for locking when said rotary member is rotated a specific angle in the horizontal direction,
   wherein said rotary member supporting member has along an outer periphery of said rotary member supporting member a supporting wall for supporting said convex bottom surface of said rotary member, and wherein one of a damping member and a lubricating member is disposed on said top surface of said supporting wall.

10. The stand rotating mechanism according to claim 1, wherein said rotary member has a concave surface and said rotary member supporting member has a convex surface.

11. A stand rotating mechanism comprising:

a rotary member supporting member including a convex bottom surface having a guide slot formed at a region including a center of said convex bottom surface of said rotary member supporting member;

a rotary member having a concave surface formatting to said convex bottom surface of said rotary member supporting member, said rotary member supporting member having a rotating shaft for fitting in said guide slot;

a first locking member provided on said concave surface of said rotary member for projecting from a peripheral portion to a central portion of said concave surface of said rotary member;

a pair of laterally asymmetric members for locking provided on said convex bottom surface of said rotary member supporting member in parallel to said guide slot, said pair of laterally asymmetric members for locking being locked with said first locking member when said rotary member is rotated a specific angle in the horizontal direction; and a second locking member provided on said concave surface of said rotary member, said second locking member formed in a U-shape having a sliding-contact surface formed into a circular-arc concentric with said rotating shaft and having a pair of walls for locking extending from end portions of said sliding-contact surface in parallel to said first locking member.

12. The stand rotating mechanism according to claim 11, wherein said pair of laterally asymmetric members for locking are formed at different positions apart from said center of said convex bottom surface.

13. A stand rotating mechanism comprising:

a rotary member supporting member including a convex bottom surface having a guide slot formed at a region including a center of said convex bottom surface of said rotary member supporting member;

a rotary member having a concave surface formatting to said convex bottom surface of said rotary member supporting member, said rotary member supporting member having a rotating shaft for fitting in said guide slot;

a first locking member provided on said concave surface of said rotary member for projecting from a peripheral portion to a central portion of said concave surface of said rotary member; and a pair of laterally asymmetric members for locking provided on said convex bottom surface of said rotary member supporting member in parallel to said guide slot, said pair of laterally asymmetric members for locking being locked with said first locking member when said rotary member is rotated a specific angle in the horizontal direction, wherein one of said pair of laterally asymmetric members for locking has a stepped portion on an upper portion of said one of said pair of laterally asymmetric members.

14. The stand rotating mechanism according to claim 11, wherein said specific angle 90° for each of right and left sides.

15. The stand rotating mechanism according to claim 11, wherein said rotary member is formed integrally with a housing of a monitor.

16. The stand rotating mechanism according to claim 11, further comprising a leg portion and wherein said rotary member supporting member is formed integrally with said leg portion.

17. The stand rotating mechanism according to claim 11, wherein said rotary member has along an outer periphery of said rotary member a supporting wall for supporting said convex bottom surface of said rotary member supporting member.

18. A stand rotating mechanism comprising:

a rotary member supporting member including a convex bottom surface having a guide slot formed at a region including a center of said convex bottom surface of said rotary member supporting member;

a rotary member having a concave surface formatting to said convex bottom surface of said rotary member supporting member, said rotary member supporting member having a rotating shaft for fitting in said guide slot;

a first locking member provided on said concave surface of said rotary member for projecting from a peripheral portion to a central portion of said concave surface of said rotary member; and a pair of laterally asymmetric members for locking provided on said convex bottom surface of said rotary member supporting member in parallel to said guide slot, said pair of laterally asymmetric members for locking being locked with said first locking member when said rotary member is rotated a specific angle in the horizontal direction, wherein said rotary member has a long an outer periphery of said rotary member a supporting wall for supporting said convex bottom surface of said rotary member supporting member, and wherein a top surface of said supporting wall is tapered.

19. A stand rotating mechanism comprising:

a rotary member supporting member including a convex bottom surface having a guide slot formed at a region including a center of said convex bottom surface of said rotary member supporting member;

a rotary member having a concave surface formatting to said convex bottom surface of said rotary member supporting member, said rotary member supporting member having a rotating shaft for fitting in said guide slot;

a first locking member provided on said concave surface of said rotary member for projecting from a peripheral portion to a central portion of said concave surface of said rotary member; and a pair of laterally asymmetric members for locking provided on said convex bottom surface of said rotary member supporting member in parallel to said guide slot, said pair of laterally asymmetric members for locking being locked with said first locking member when said rotary member is rotated a specific angle in the horizontal direction, wherein said rotary member has a long an outer periphery of said rotary member a supporting wall for supporting said convex bottom surface of said rotary member supporting member, and wherein one of a damping member and a lubricating member is disposed on said top surface of said supporting wall.

20. The stand rotating mechanism according to claim 11, wherein said rotary member supporting member has a concave surface and said rotary member has a convex surface.

* * * * *